(12) United States Patent
Ujiie et al.

(10) Patent No.: US 12,447,911 B2
(45) Date of Patent: Oct. 21, 2025

(54) OPERATION PANEL

(71) Applicant: Marelli Corporation, Saitama (JP)

(72) Inventors: Hideto Ujiie, Saitama (JP); Yuuma Tasai, Saitama (JP)

(73) Assignee: Marelli Corporation, Saitama (JP)

( * ) Notice: Subject to any disclaimer, the term of this patent is extended or adjusted under 35 U.S.C. 154(b) by 203 days.

(21) Appl. No.: 18/276,395

(22) PCT Filed: Dec. 9, 2021

(86) PCT No.: PCT/JP2021/045403
§ 371 (c)(1),
(2) Date: Aug. 8, 2023

(87) PCT Pub. No.: WO2022/172570
PCT Pub. Date: Aug. 18, 2022

(65) Prior Publication Data
US 2024/0109502 A1 Apr. 4, 2024

(30) Foreign Application Priority Data
Feb. 9, 2021 (JP) ................................. 2021-019177

(51) Int. Cl.
*B60R 16/00* (2006.01)
*B60R 16/023* (2006.01)
(Continued)

(52) U.S. Cl.
CPC ........ *B60R 16/005* (2013.01); *B60R 16/0231* (2013.01); *G06F 3/0444* (2019.05); *H03K 17/962* (2013.01)

(58) Field of Classification Search
CPC ....... H01H 2207/004; H01H 2207/016; H01H 2207/01; H01H 2207/04; H01H 2209/00;
(Continued)

(56) References Cited

U.S. PATENT DOCUMENTS

2008/0042971 A1* 2/2008 Sachs .................. G06F 3/03548
345/156
2015/0130478 A1 5/2015 Erkens et al.

FOREIGN PATENT DOCUMENTS

JP 2006-145413 A 6/2006
JP 2007-018810 A 1/2007
(Continued)

*Primary Examiner* — Anthony R Jimenez
(74) *Attorney, Agent, or Firm* — Young Basile Hanlon & MacFarlane, P.C.

(57) ABSTRACT

An operation panel includes a touch position sensor configured to output an electrical signal corresponding to a contact area between a finger of a user and a switch and a controller to which an electrical signal is input from the touch position sensor. The controller is configured to: determine that the finger of the user and the touch position sensor are in contact with each other when the calculation value calculated based on the electrical signal input from the touch position sensor exceeds the preset first threshold value, and set, based on the calculation value, the second threshold value larger than the first threshold value in accordance with a magnitude of the calculation value; and determine that the touch position sensor is in the operation state of being operated when the calculation value exceeds the second threshold value.

5 Claims, 7 Drawing Sheets

(51) Int. Cl.
*G06F 3/044* (2006.01)
*H03K 17/96* (2006.01)

(58) Field of Classification Search
CPC ....... H01H 2209/024; H01H 2209/038; H01H 2209/074; H01H 2211/024; H01H 2211/002; H03K 17/962; B60R 16/0231; B60R 16/005; G06F 3/0444
USPC ........................................................ 200/600
See application file for complete search history.

(56) References Cited

FOREIGN PATENT DOCUMENTS

| | | |
|---|---|---|
| JP | 2014-532241 A | 12/2014 |
| JP | 2015-090727 A | 5/2015 |
| JP | 2019-095985 A | 6/2019 |

* cited by examiner

OPERATION PANEL

This application is a national phase 371 of International Application Serial No. PCT/JP2021/045403, filed on Dec. 9, 2021, which claims priority to Japanese Patent Application Serial No. 2021-019177, filed Feb. 9, 2021, the entire contents of which are incorporated herein by reference.

TECHNICAL FIELD

The present invention relates to an operation panel.

BACKGROUND ART

JP2019-95985A discloses a method for controlling a capacitance sensor that detects a push-in amount by detecting that, based on a change in capacitance, a finger of a user is in contact with the capacitance sensor and a contact area between a fingertip and the capacitance sensor is increased by a push-in operation. In addition, it is disclosed that the capacitance sensor disclosed in JP2019-95985A is used as a part of a switch in an operation panel such as a touch panel.

SUMMARY OF INVENTION

In such an operation panel, a switch is switched based on a threshold value of the push-in amount.

However, when setting the threshold value, if the threshold value is set to be small, for example, in a case where a person with large fingers operates the operation panel, the switch may be switched simultaneously with contact with the operation panel. On the contrary, if the threshold value is set to be large, for example, in a case where a user with small fingers such as a child operates the operation panel, the threshold value may not be exceeded, and the switch may need to be pushed-in hard, or the switch may not be switched.

An object of the invention is to accurately detect an operation on a switch regardless of a size of a finger of the user.

According to an aspect of the invention, an operation panel includes: a panel member; a switch unit provided on the panel member and pressed by a user; a sensor unit configured to output an electrical signal corresponding to a contact area between a finger of the user and the switch unit; and a control unit to which the electrical signal is input from the sensor unit. The control unit is configured to: determine that the finger of the user and the switch unit are in contact with each other when a calculation value calculated based on the electrical signal input from the sensor unit exceeds a preset first threshold value, and set, based on the calculation value, a second threshold value larger than the first threshold value in accordance with a magnitude of the calculation value; and determine that the switch unit is in an operation state of being operated when the calculation value exceeds the second threshold value.

In the above aspect, when it is determined that the finger of the user and the sensor unit are in contact with each other, the second threshold value corresponding to the contact area between the finger of the user and the switch unit is set, and it is determined whether the switch unit is operated based on the second threshold value. Accordingly, an operation on a switch can be accurately detected regardless of a size of the finger of the user.

DESCRIPTION OF EMBODIMENTS

Hereinafter, an operation panel 2 and an instrument panel 1 serving as an interior component for a vehicle to which the operation panel 2 is applied according to an embodiment of the invention will be described with reference to the drawings.

Figure 1:
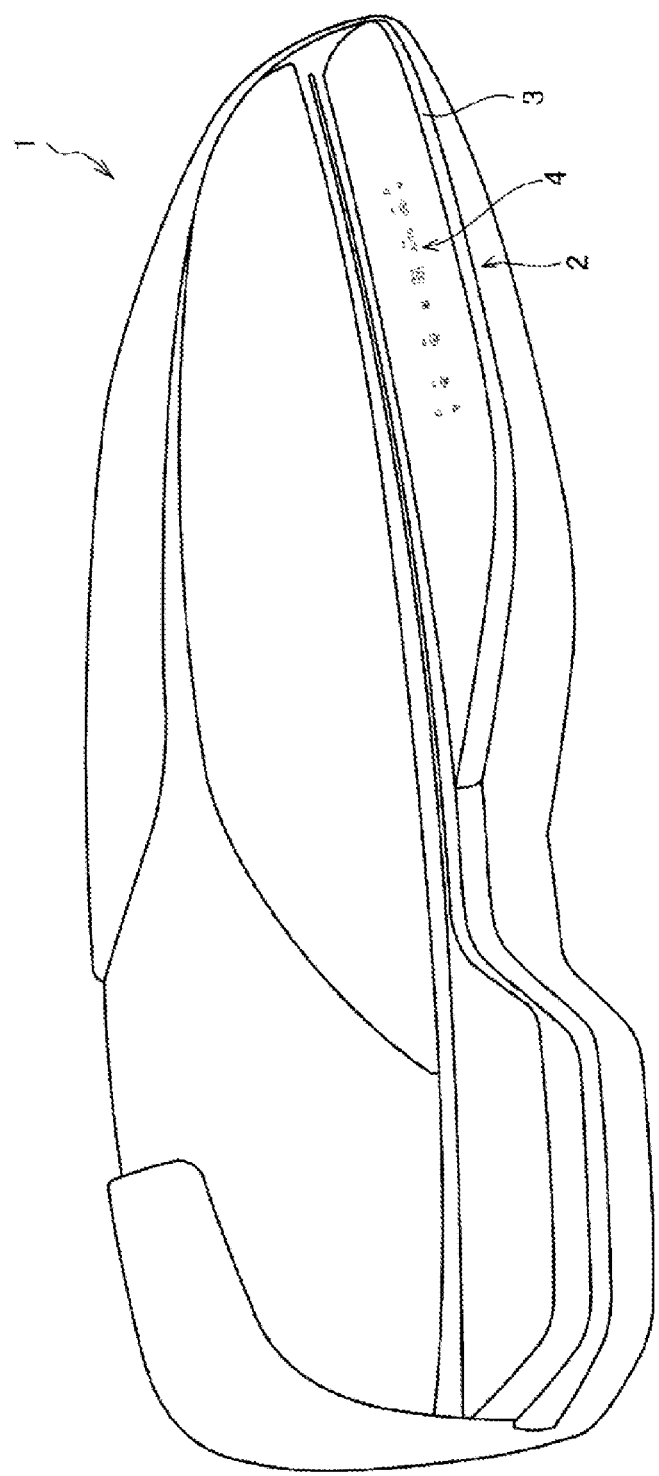
FIG. 1 is a perspective view illustrating a configuration of an interior component for a vehicle to which an operation panel according to an embodiment of the invention is applied.

First, the instrument panel 1 will be described with reference to FIG. 1. FIG. 1 is a perspective view illustrating a configuration of the instrument panel 1.

As illustrated in FIG. 1, the instrument panel 1 includes the operation panel 2. The instrument panel 1 is provided in a cabin of the vehicle. The instrument panel 1 is provided in front of the cabin including a front face of a seat for a driver. An instrument (not illustrated) indicating information on an automobile is disposed on the instrument panel 1.

Next, the operation panel 2 will be described with reference to FIGS. 2 and 3.

Figure 2:
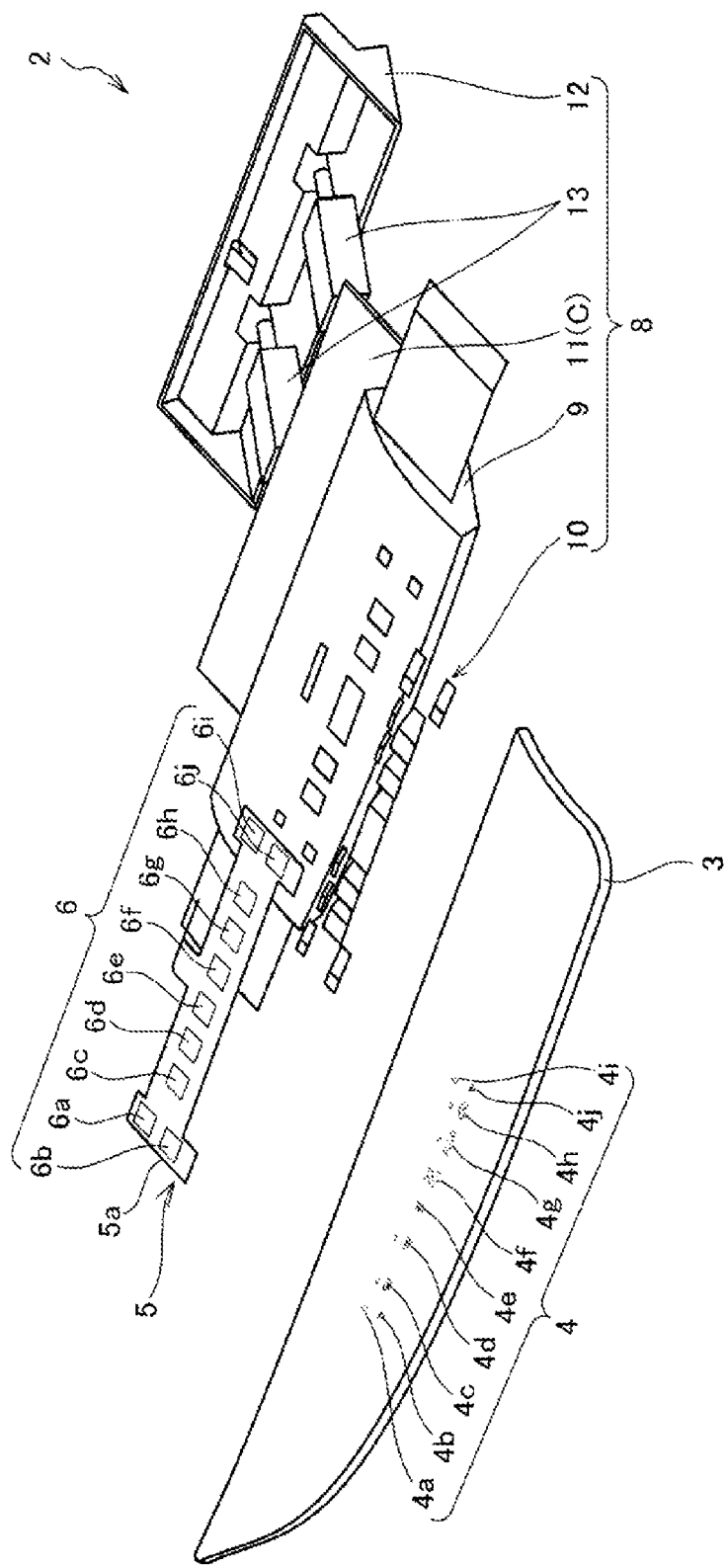
FIG. 2 is an exploded perspective view of the operation panel.

FIG. 2 is an exploded perspective view of the operation panel 2. FIG. 3 is a cross-sectional view illustrating a configuration of a touch position sensor 6.

As illustrated in FIG. 2, the operation panel 2 includes a panel member 3, a sensor module 5, and a main body 8.

The panel member 3 is formed in a free curved surface shape in which at least a part is curved. The panel member 3 is exposed in the cabin of the vehicle. The panel member 3 includes a switch 4 serving as a switch unit.

The switch 4 is provided as a part of the panel member 3. The switch 4 is to be pressed by a user. The switch 4 includes a first switch 4a to a tenth switch 4j for operating an air conditioner.

The first switch 4a, a second switch 4b, a ninth switch 4i, and the tenth switch 4j are switches for adjusting a temperature of the air conditioner. A third switch 4c is a switch for switching ON/OFF of a rear defogger. A fourth switch 4d is a switch for switching ON/OFF of a front defroster. A fifth switch 4e and a sixth switch 4f are switches for adjusting air volume of the air conditioner. A seventh switch 4g is a switch for switching ON/OFF of an auto mode. An eighth switch 4h is a switch for switching inside air and outside air.

As illustrated in FIG. 2, the sensor module 5 includes a sensor sheet 5a and the touch position sensor 6.

Figure 3:
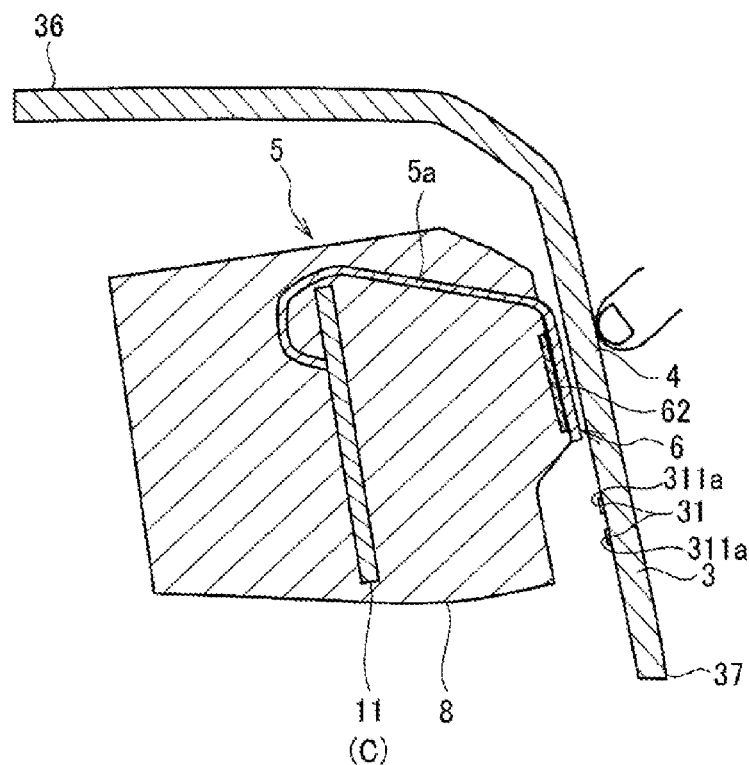
FIG. 3 is a cross-sectional view illustrating a configuration of a touch position sensor.

As illustrated in FIG. 3, the sensor sheet 5a is connected to a board portion 11 (controller C) serving as a control unit.

The sensor sheet 5*a* electrically connects the touch position sensor 6 and the board portion 11.

The touch position sensor 6 is provided on the sensor sheet 5*a* so as to face a back surface of the panel member 3. The touch position sensor 6 is provided corresponding to each switch 4. The touch position sensor 6 detects that a finger of the user touches each switch 4. That is, first to tenth touch position sensors 6*a* to 6*j* are provided at positions corresponding to the first to tenth switches 4*a* to 4*j*, respectively.

As illustrated in FIG. 3, the touch position sensor 6 is provided on the back surface of the panel member 3 so as to correspond to each switch 4. The touch position sensor 6 is a capacitance proximity sensor. The touch position sensor 6 includes a plate-shaped electrode 62 disposed on the sensor sheet 5*a*.

The touch position sensor 6 measures a capacitance value at a cycle of, for example, 10 [ms]. When the finger of the user touches the switch 4, the capacitance value measured by the touch position sensor 6 changes according to a contact area of the finger of the user. The capacitance value detected by the touch position sensor 6 is transmitted as an electrical signal to the controller C (board portion 11). The controller C (board portion 11) determines which switch 4 the finger of the user touches based on the electrical signal transmitted from the touch position sensor 6.

As illustrated in FIG. 2, the main body 8 includes a base portion 9, an illumination portion 10, the board portion 11, a case portion 12, and a pair of solenoids 13 serving as a vibration generation device.

The base portion 9 is attached to a vehicle body. A plurality of through holes for embedding the illumination portion 10 are formed in the base portion 9.

The illumination portion 10 is a transparent member that allows light to pass through. A plurality of illumination portions 10 are provided corresponding to each of the first to tenth switches 4*a* to 4*j*. The illumination portions 10 transmit light illuminating the first to tenth switches 4*a* to 4*j* from the back surface.

The board portion 11 is provided between the base portion 9 and the case portion 12. The electrical signal from the touch position sensor 6 is input to the board portion 11. The board portion 11 outputs an electrical signal corresponding to the input electrical signal to the controller C. A plurality of light emitting portions (not illustrated) for irradiating the illumination portions 10 are mounted on the board portion 11. The light emitting portion includes, for example, a light emitting diode (LED).

The case portion 12 is inserted into a back side of the base portion 9 and is attached to the vehicle body. The case portion 12 holds one end of the solenoid 13.

As illustrated in FIG. 2, the solenoid 13 is disposed on a back surface side of the panel member 3. The solenoid 13 generates a tactile sensation to the finger of the user by vibrating the panel member 3 when the switch 4 is operated. The solenoid 13 includes a coil (not illustrated) and a movable iron core (not illustrated).

When the coil is energized, the solenoid 13 displaces the movable iron core toward the panel member 3. On the other hand, when the energization of the coil is stopped, the solenoid 13 separates the movable iron core from the panel member 3. Accordingly, the solenoid 13 generates vibration in the panel member 3.

The one end of the solenoid 13 is held by the case portion 12. Accordingly, the vibration generated by the displacement of the movable iron core can be reliably transmitted to the panel member 3.

In the operation panel 2 configured as described above, when the finger of the user touches the switch 4, the capacitance value measured by the touch position sensor 6 changes according to the contact area of the finger of the user. The controller C determines whether the switch 4 is in an operation state or a non-operation state based on the change in the capacitance value.

Incidentally, when setting a threshold value for determining whether the switch 4 is in the operation state or the switch 4 is in the non-operation state, for example, it is conceivable to set the threshold value in accordance with an average size of the finger.

However, for example, when a user with small fingers such as a child operates the switch 4, unless a contact area between the finger and the touch position sensor 6 is increased by strongly pressing the switch 4, the switch 4 may not be recognized as being in the operation state. On the contrary, when a user with large fingers operates the switch 4, the switch 4 may be recognized as being in the operation state even if the switch 4 is simply touched lightly. That is, if the threshold value for determining whether the switch 4 is in the operation state is set constant, an operation feeling of the switch 4 may be greatly different depending on the user, and the operation on the switch 4 by the user may not be accurately detected.

Figure 4:
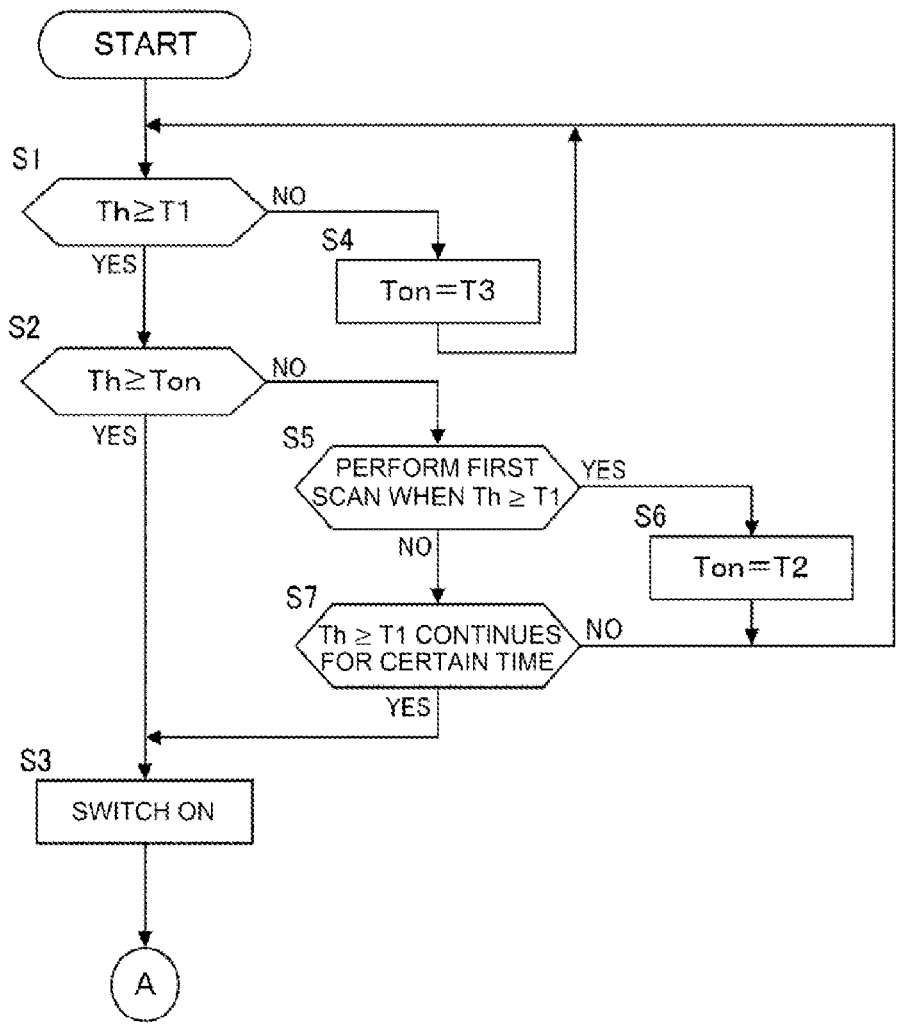
FIG. 4 is a flowchart related to switch determination control.

Therefore, in the present embodiment, when the switch 4 is operated, regardless of the difference in the size of the finger, the operation on the switch 4 is accurately detected, and the threshold value for determining whether the switch 4 is operated or not operated is made variable such that a similar operation feeling can be obtained. Hereinafter, control related to the determination of the operation state and the non-operation state of the switch 4 (hereinafter also referred to as "switch determination control") will be described with reference to flowcharts illustrated in FIGS. 4 and 5.

In step S1, the controller C determines whether a calculation value Th is equal to or larger than a first threshold value T1. Specifically, the controller C calculates the calculation value Th based on the electrical signal corresponding to the capacitance value input from the touch position sensor 6. That is, the controller C calculates the calculation value Th that is a value corresponding to the contact area between the finger of the user and the touch position sensor 6. The calculation value Th is calculated based on the capacitance value measured at a predetermined cycle (for example, a cycle of 10 [ms]) by the touch position sensor 6.

The controller C determines whether the calculated calculation value Th is equal to or larger than the preset first threshold value T1. The first threshold value T1 is set to a value at which it can be determined that the finger of the user is in contact for operation.

When the calculation value Th is equal to or larger than the first threshold value T1, the process proceeds to step S2, and when the calculation value Th is smaller than the first threshold value T1, the process proceeds to step S4.

In step S2, the controller C determines whether the calculation value Th is equal to or larger than an ON threshold value Ton. Specifically, the controller C determines whether a latest calculation value Th is equal to or larger than the ON threshold value Ton. The ON threshold value Ton is a threshold value for determining that the switch 4 is in the operation state (state in which the switch 4 is being operated to turn to ON), and is a variable value in the present embodiment. In an initial state, the ON threshold value Ton is set to a third threshold value T3, which is a fixed value.

When the calculation value Th is equal to or larger than the ON threshold value Ton, the process proceeds to step S3, and when the calculation value Th is smaller than the ON threshold value Ton, the process proceeds to step S5.

In step S3, the controller C determines that the switch 4 is in the operation state. Specifically, the controller C determines that the operated switch 4 is in the operation state, and performs an operation corresponding to a device corresponding to the operated switch 4 on the device.

In step S4, the controller C sets the ON threshold value Ton to the third threshold value T3. Specifically, when the ON threshold value Ton is set to a value other than T3, the controller C sets the ON threshold value Ton to the third threshold value T3. After the ON threshold value Ton is set to the third threshold value T3 in step S4, the process returns to step S1.

In step S5, it is determined whether it is first scan after the calculation value Th becomes equal to or larger than the first threshold value T1. Specifically, the controller C determines whether the capacitance value detected by the touch position sensor 6 is a capacitance value detected for the first time after the calculation value Th exceeds the first threshold value T1. When the capacitance value detected by the touch position sensor 6 is the capacitance value detected for the first time after the calculation value Th exceeds the first threshold value T1, the process proceeds to step S6. On the contrary, when the capacitance value detected by the touch position sensor 6 is not the capacitance value detected for the first time after the calculation value Th exceeds the first threshold value T1, the process proceeds to step S7. The determination in step S5 may be performed based on the calculation value Th. In this case, the determination is performed based on whether the calculation value Th is calculated for the first time after the calculation value Th is equal to or larger than the first threshold value T1.

In step S6, the controller C sets the ON threshold value Ton to a second threshold value T2. Specifically, the controller C sets, as the second threshold value T2, a value obtained by multiplying, by a predetermined coefficient α, a calculation value Th1 calculated based on the capacitance value when the first scan is performed after the calculation value Th is equal to or larger than the first threshold value T1. After setting the second threshold value T2 to the ON threshold value Ton, the controller C returns to step S1 and performs the determination in step S1 again. The second threshold value T2 is a value larger than the first threshold value T1 and is set within a range that does not exceed the third threshold value T3. In other words, an upper limit value of the second threshold value T2 is the third threshold value T3.

In step S7, the controller C determines whether a state in which the calculation value Th is equal to or larger than the first threshold value T1 continues for a certain time TL. Specifically, the controller C determines whether a state in which the calculation value Th does not reach the ON threshold value Ton and the calculation value Th is equal to or larger than the first threshold value T1 continues for the certain time TL. When the state in which the calculation value Th is equal to or larger than the first threshold value T1 continues for the certain time TL, the process proceeds to step S3, and it is determined that the switch 4 is in the operation state. On the other hand, when the state in which the calculation value Th is equal to or larger than the first threshold value T1 does not continue for the certain time TL, the process returns to step S1.

In this way, in the present embodiment, the ON threshold value Ton (second threshold value T2) is set based on the calculation value Th1 calculated based on the capacitance value when the first scan is performed after the calculation value Th is equal to or larger than the first threshold value T1. Specifically, when it is determined that the finger of the user and the touch position sensor 6 are in contact with each other, the ON threshold value Ton (second threshold value T2) is set corresponding to a size of the contact area between the finger of the user and the switch 4. Accordingly, the operation on the switch 4 can be accurately detected regardless of the size of the finger of the user, and the operation feeling of the user can be made equal regardless of the size of the finger.

Figure 5:
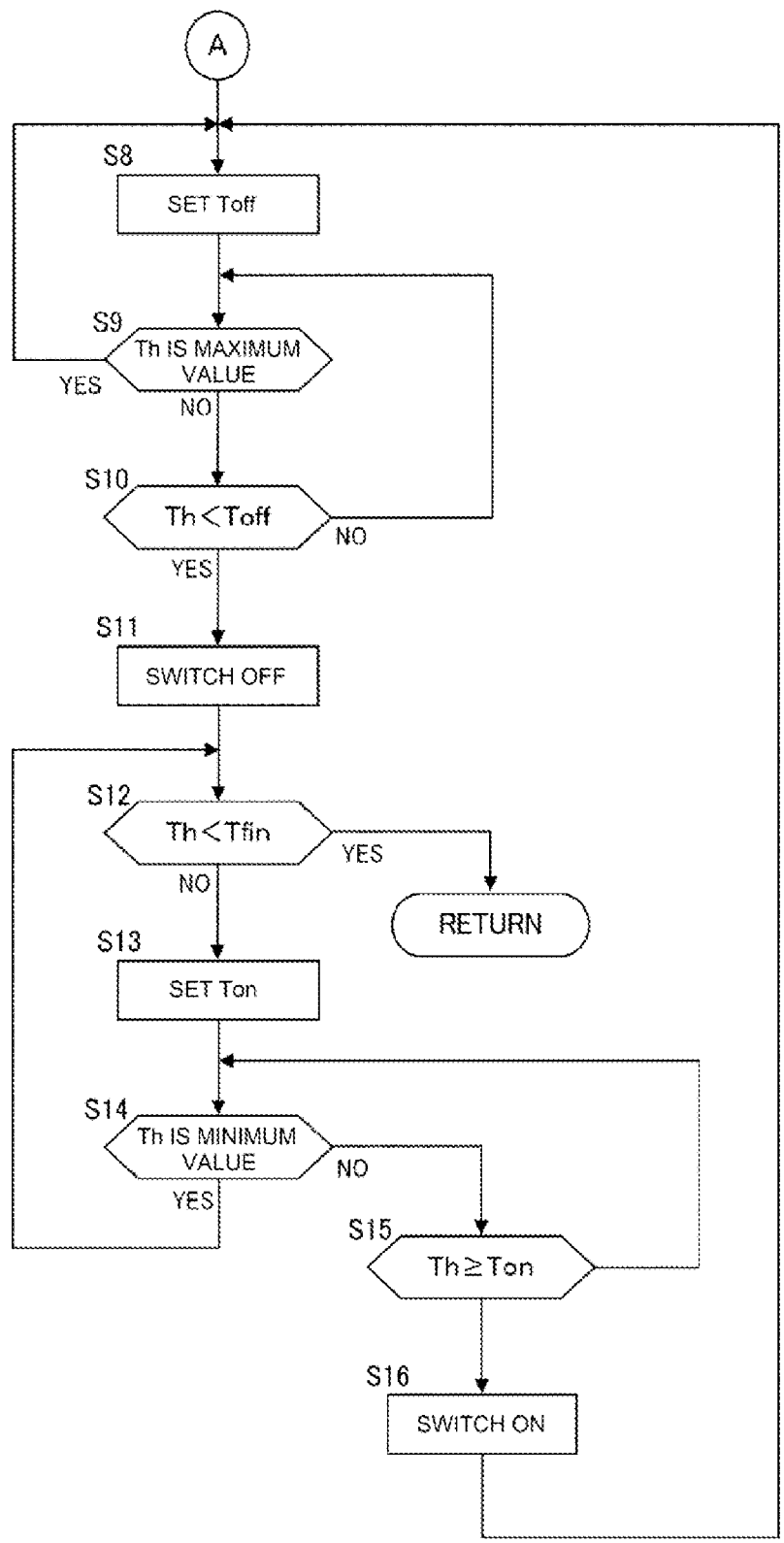
FIG. 5 is a flowchart related to the switch determination control.

Subsequently, control after it is determined that the switch 4 is in the operation state (flow after step S8) will be described with reference to FIG. 5.

In step S8, the controller C sets an OFF threshold value Toff. Specifically, the controller C sets, as the OFF threshold value Toff, a value obtained by multiplying, by a predetermined coefficient β, a maximum calculation value Th in the calculation value Th after it is determined that the switch 4 is in the operation state. The OFF threshold value Toff is a threshold value for determining that the switch 4 is in the non-operation state, and is a variable value in the present embodiment. In addition, the OFF threshold value Toff corresponds to a fourth threshold value T4.

In step S9, the controller C determines whether the calculation value Th is the maximum value. Specifically, it is determined whether the calculated latest calculation value Th is the maximum value in the calculation value Th calculated after it is determined that the switch 4 is in the operation state. When the latest calculation value Th is the maximum value in the calculation value Th calculated after it is determined that the switch 4 is in the operation state, the process returns to step S8. On the contrary, when the latest calculation value Th is not the maximum value in the calculation value Th calculated after it is determined that the switch 4 is in the operation state, the process proceeds to step S10.

In step S10, the controller C determines whether the calculation value Th is smaller than the OFF threshold value Toff. Specifically, the controller C determines whether the latest calculation value Th is smaller than the OFF threshold value Toff set in step S8. When the latest calculation value Th is smaller than the OFF threshold value Toff, that is, when the calculation value Th is lowered so as to fall below the OFF threshold value Toff, the process proceeds to step S11, and it is determined that the switch 4 is in the non-operation state (state in which an operation of turning on the switch 4 is ended). On the contrary, when the latest calculation value Th is equal to or larger than the OFF threshold value Toff, the process returns to step S9, and the determination in step S9 is performed again.

In step S12, the controller C determines whether the calculation value Th is smaller than a threshold value Tfin. Specifically, the controller C determines whether the calculated latest calculation value Th is smaller than the predetermined threshold value Tfin. The threshold value Tfin is a value at which it can be reliably determined that the finger of the user is released, and is a fixed value. The threshold value Tfin corresponds to a fifth threshold value T5.

When the latest calculation value Th is smaller than the threshold value Tfin, that is, when the calculation value Th is lowered so as to fall below the threshold value Tfin, it is determined that the finger of the user is released from the switch 4, each threshold value is reset, and the process returns to START. On the contrary, when the latest calculation value Th is equal to or larger than the threshold value Tfin, the process proceeds to step S13.

In step S13, the controller C sets the ON threshold value Ton. Specifically, the controller C sets, as a new ON threshold value Ton, a value obtained by multiplying, by a predetermined coefficient γ, a minimum calculation value Th in the calculation value Th after it is determined that the switch 4 is in the non-operation state.

In step S14, the controller C determines whether the calculation value Th is the minimum value. Specifically, it is determined whether the calculated latest calculation value Th is the minimum value in the calculation value Th calculated after it is determined that the switch 4 is in the non-operation state. When the latest calculation value Th is the minimum value in the calculation value Th calculated after it is determined that the switch 4 is in the non-operation state, the process returns to step S12. On the contrary, when the latest calculation value Th is not the minimum value in the calculation value Th calculated after it is determined that the switch 4 is in the non-operation state, the process proceeds to step S15.

In step S15, the controller C determines whether the calculation value Th is equal to or larger than the ON threshold value Ton. Specifically, the controller C determines whether the latest calculation value Th is equal to or larger than the ON threshold value Ton set in step S13. More specifically, in step S15, after it is determined that the switch 4 is in the non-operation state, it is determined whether the contact area between the finger of the user and the touch position sensor 6 increases, that is, whether a pressing force of the switch 4 increases and the calculation value Th is equal to or larger than the ON threshold value Ton. When the calculation value Th is equal to or larger than the ON threshold value Ton in step S15, the process proceeds to step S16, and when the calculation value Th is smaller than the ON threshold value Ton, the process returns to step S14.

In step S16, it is determined that the switch 4 is in the operation state. Thereafter, the process returns to step S8, and the determination in step S8 and subsequent steps are performed again. Accordingly, even when the user continuously operates the switch 4 by changing the pressing force to be strong or weak while keeping the finger in contact with the switch 4, the operation state and the non-operation state can be determined. The continuous operation will be described later in detail.

The calculation value Th is a value corresponding to the contact area between the user and the switch 4, and the maximum value of the calculation value Th, that is, a maximum value of the contact area can be regarded as a value corresponding to the size of the finger of the user. Therefore, in the present embodiment, after it is determined that the switch 4 is in the operation state, the OFF threshold value Toff is set based on the maximum value of the calculation value Th. Accordingly, since the OFF threshold value Toff corresponding to the size of the finger of the user can be set, the operation on the switch 4 can be accurately detected, and the operation feeling of the user can be made equal regardless of the size of the finger.

Figure 6:
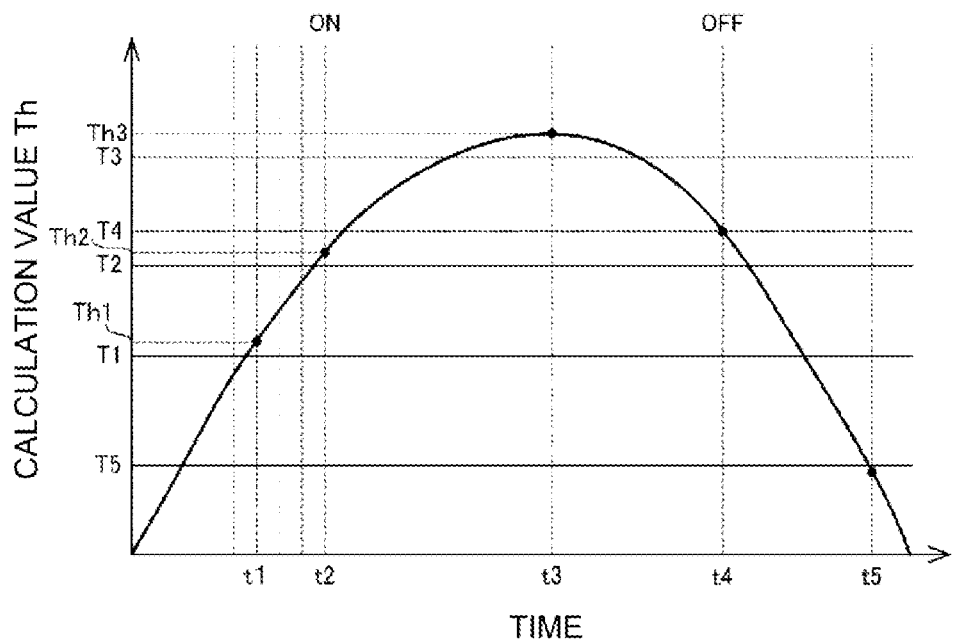
FIG. 6 is an example of a time chart when a calculation value Th exceeds an ON threshold value Ton.
Figure 7:
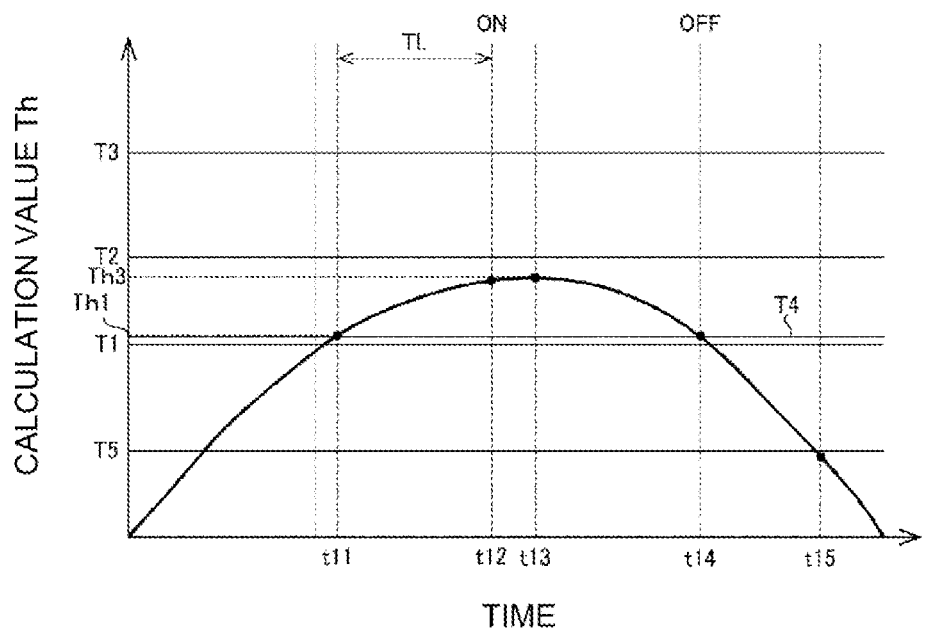
FIG. 7 is an example of a time chart when the calculation value Th does not exceed the ON threshold value Ton (second threshold value T2).

Next, a specific example of the switch determination control will be described with reference to time charts illustrated in FIGS. 6 to 8. Dotted lines on horizontal axes in FIGS. 6 to 8 indicate detection timings of the touch position sensor 6.

First, with reference to FIG. 6, a case where the calculation value Th exceeds the ON threshold value Ton (second threshold value T2) will be described.

When the user starts the operation on the switch 4, the calculation value Th gradually increases as the contact area gradually increases. Then, when the controller C determines that the calculation value Th1 calculated at a time t1 exceeds the first threshold value T1, the controller C sets the ON threshold value Ton (second threshold value T2). Specifically, the value obtained by multiplying the calculation value Th1 by the coefficient α is set as the ON threshold value Ton (second threshold value T2).

When the user further pushes the finger, the contact area further increases. Then, when the controller C determines that a calculation value Th2 calculated at a time t2 exceeds the ON threshold value Ton (second threshold value T2), the controller C determines that the switch 4 is in the operation state.

After determining that the switch 4 is in the operation state (after time t2), the controller C obtains the maximum value in the calculated calculation value Th and sets the OFF threshold value Toff (fourth threshold value T4) based on the maximum value. In an example illustrated in FIG. 6, the calculation value Th is the maximum value (calculation value Th3) at a time t3, and after the time t3, the operation state of the switch 4 is determined based on the OFF threshold value Toff (fourth threshold value T4) calculated based on the calculation value Th3.

When the user starts to return the finger and the contact area decreases, the calculation value Th gradually decreases. Then, when the calculation value Th is smaller than the fourth threshold value T4 (time t4), the controller C determines that the switch 4 is in the non-operation state. Furthermore, at a time t5, when the calculation value Th is smaller than the threshold value Tfin (fifth threshold value T5), the controller C ends the switch determination control.

Next, with reference to FIG. 7, a case where the calculation value Th does not exceed the ON threshold value Ton (second threshold value T2) will be described.

When the user starts the operation on the switch 4, the calculation value Th gradually increases as the contact area gradually increases. Then, when the controller C determines that the calculation value Th1 calculated at a time t11 exceeds the first threshold value T1, the controller C sets the ON threshold value Ton (second threshold value T2). Specifically, the value obtained by multiplying the calculation value Th1 by the coefficient α is set as the ON threshold value Ton (second threshold value T2).

When the user further pushes the finger, the contact area further increases. However, when the contact area does not increase so much and a state in which the calculation value Th does not increase to the ON threshold value Ton (second threshold value T2) continues for the certain time TL (time t12), the controller C determines that the switch 4 is in the operation state even when the calculation value Th does not increase to the ON threshold value Ton (second threshold value T2).

After determining that the switch 4 is in the operation state (after time t12), the controller C obtains the maximum value in the calculated calculation value Th and sets the OFF threshold value Toff (fourth threshold value T4) based on the maximum value. In an example illustrated in FIG. 7, the calculation value Th is the maximum value (calculation value Th3) at a time t13, and after the time t13, the operation state of the switch 4 is determined based on the OFF threshold value Toff (fourth threshold value T4) calculated based on the calculation value Th3.

When the user starts to return the finger and the contact area decreases, the calculation value Th gradually decreases. Then, when the calculation value Th is smaller than the fourth threshold value T4 (time t14), the controller C determines that the switch 4 is in the non-operation state. Furthermore, at a time t15, when the calculation value Th is smaller than the threshold value Tfin (fifth threshold value T5), the controller C ends the switch determination control.

In this way, in the present embodiment, when a state in which the calculation value Th exceeds the first threshold value T1 continues for the certain time TL, it is determined that the switch 4 is in the operation state even when the calculation value Th does not increase to the ON threshold value Ton (second threshold value T2). Accordingly, the operation on the switch 4, in other words, an operation intention of the user can be accurately detected even when the contact area does not increase, for example, by being operated with a fingertip or the like.

Next, with reference to FIG. 8, a case where a consecutive pressing operation is performed will be described.

The consecutive pressing operation is, for example, continuously operating the switch 4 (first switch 4a or the like) when the temperature of the air conditioner is adjusted. Specifically, for example, after the first switch 4a is strongly pressed, the force is slightly relaxed, and then operation of pressing the first switch 4a again strongly is continuously performed to adjust the temperature. That is, in the consecutive pressing operation, the user adjusts the pressing force of the switch 4 so as to repeat the operation state and the non-operation state of the switch 4 without releasing the finger from the switch 4.

When the user starts the operation on the switch 4, the calculation value Th gradually increases as the contact area gradually increases. Then, when the controller C determines that the calculation value Th1 calculated at a time t21 exceeds the first threshold value T1, the controller C sets the ON threshold value Ton (second threshold value T2). Specifically, the value obtained by multiplying the calculation value Th1 by the coefficient α is set as the ON threshold value Ton (second threshold value T2).

When the user further pushes the finger, the contact area further increases. Then, when the controller C determines that the calculation value Th2 calculated at a time t22 exceeds the second threshold value T2, the controller C determines that the switch 4 is in the operation state.

After determining that the switch 4 is in the operation state (after time t22), the controller C obtains the maximum value in the calculated calculation value Th and sets the OFF threshold value Toff (fourth threshold value T4) based on the maximum value.

Figure 8:
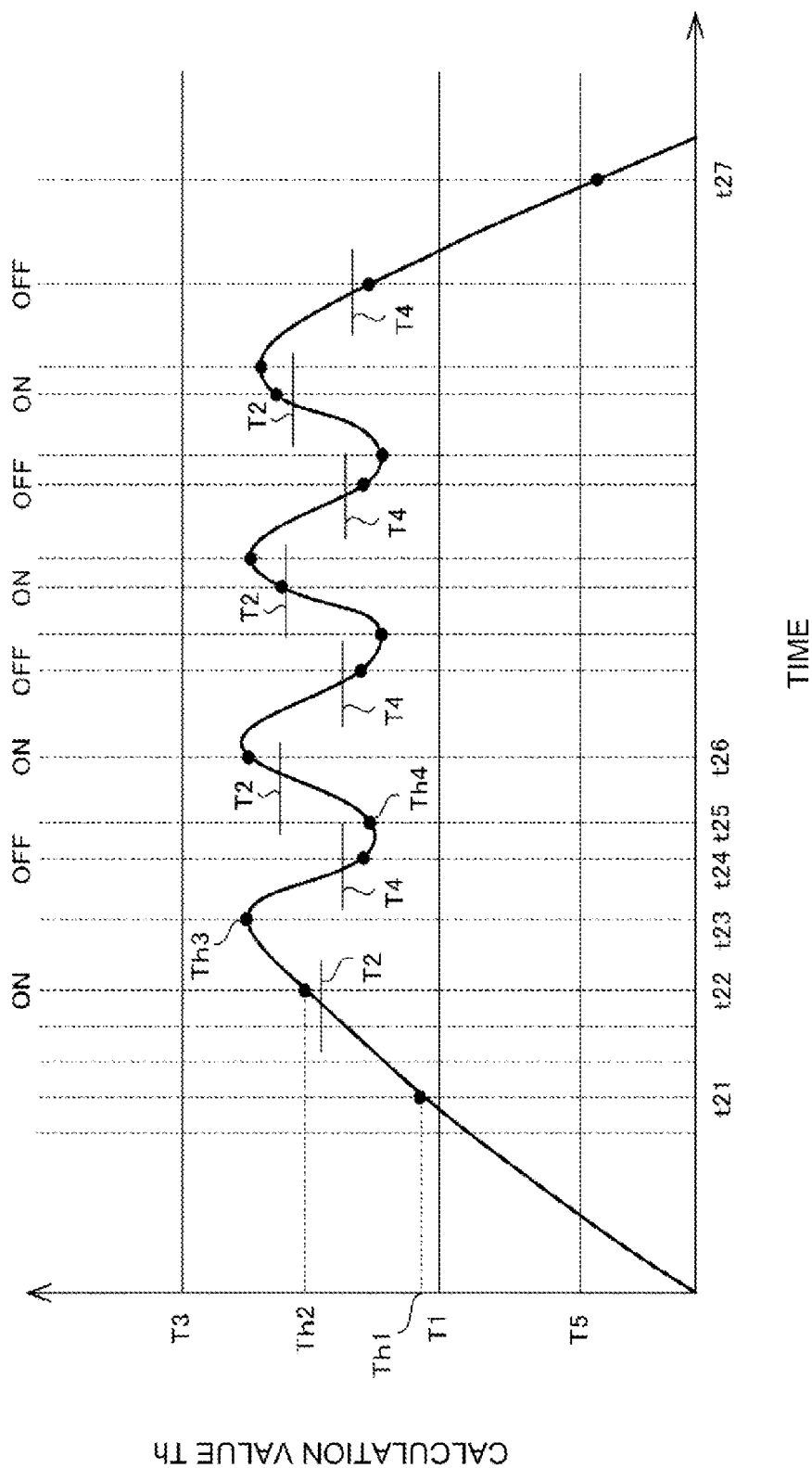
FIG. 8 is an example of a time chart when a consecutive pressing operation is performed.

In an example illustrated in FIG. 8, the calculation value Th is the maximum value (calculation value Th3) at a time t23, and the operation state of the switch 4 is determined based on the OFF threshold value Toff (fourth threshold value T4) calculated based on the calculation value Th3.

When the user starts to return the finger and the contact area decreases, the calculation value Th gradually decreases. Then, when the calculation value Th is smaller than the fourth threshold value T4 (time t24), the controller C determines that the switch 4 is in the non-operation state.

When the controller C determines that the switch 4 is in the non-operation state, the controller C sets the second threshold value T2 again. Specifically, the value obtained by multiplying the calculation value Th by the coefficient γ is set as a new ON threshold value Ton (second threshold value T2). In the example illustrated in FIG. 8, after the time t24, the calculation value Th is the minimum value (calculation value Th4) at a time t25, and after the time t25, the operation state of the switch 4 is determined based on the second threshold value T2 calculated based on the calculation value Th4.

Then, when the user pushes the finger again and the calculation value Th exceeds the newly set ON threshold value Ton (second threshold value T2) (time t26), the controller C determines that the calculation value Th2 calculated at the time t22 exceeds the ON threshold value Ton (second threshold value T2), and determines that the switch 4 is in the operation state.

Thereafter, the same control is repeated until the calculation value Th exceeds the threshold value Tfin (fifth threshold value T5) and falls (time t27). After the time t26, only reference numerals are illustrated in FIG. 8, and the description thereof is omitted.

As described above, in the present embodiment, since the ON threshold value Ton (second threshold value T2) and the OFF threshold value Toff (fourth threshold value T4) are set based on the minimum value and the maximum value of the calculation value Th, even when the consecutive pressing operation is performed on the switch 4, compared to a case where the ON threshold value Ton (second threshold value T2) and the OFF threshold value Toff (fourth threshold value T4) are constant values, the operation intention of the user can be accurately understood, and the operation on the switch 4 can be detected more accurately.

In the above embodiment, the ON threshold value Ton (second threshold value T2) and the OFF threshold value Toff (fourth threshold value T4) are set by multiplying the calculation value Th by a predetermined coefficient (coefficients α, β, and γ), but the invention is not limited to thereto, and the ON threshold value Ton and the OFF threshold value Toff may be set by adding a predetermined coefficient to the calculation value Th, or the like.

According to the above embodiment, the following effects are achieved.

The operation panel 2 includes: the panel member 3; the switch 4 (switch unit) provided on the panel member 3 and to be pressed by the user; the touch position sensor 6 (sensor unit) configured to output the electrical signal corresponding to the contact area between the finger of the user and the switch 4 (switch unit); and the controller C (control unit) to which the electrical signal is input from the touch position sensor 6 (sensor unit). The controller C (control unit) is configured to: determine that the finger of the user and the touch position sensor 6 (sensor unit) are in contact with each other when the calculation value Th calculated based on the electrical signal input from the touch position sensor 6 (sensor unit) exceeds the preset first threshold value T1, and set, based on the calculation value Th1, the second threshold value T2 (ON threshold value Ton) larger than the first threshold value T1 in accordance with a magnitude of the calculation value Th1; and determine that the touch position sensor 6 (sensor unit) is in the operation state of being operated when the calculation value Th exceeds the second threshold value T2 (ON threshold value Ton).

When it is determined that the finger of the user and the touch position sensor 6 (sensor unit) are in contact with each other, the second threshold value T2 (ON threshold value Ton) corresponding to the contact area between the finger of the user and the switch 4 (switch unit) is set, and it is determined whether the switch 4 (switch unit) is operated based on the second threshold value T2 (ON threshold value Ton). Accordingly, the operation on the switch 4 can be accurately detected regardless of the size of the finger of the user.

In the operation panel 2, the second threshold value T2 is set within the range that does not exceed the third threshold value T3 which is a predetermined upper limit value.

By determining an upper limit for the second threshold value T2, the second threshold value T2 can be prevented from being excessively large.

In the operation panel 2, the second threshold value T2 is set by multiplying, by the predetermined coefficient α, the calculation value which is calculated for the first time when the calculation value Th exceeds the first threshold value T1.

In the operation panel 2, the second threshold value T2 is set by adding a predetermined coefficient to the calculation value Th which is calculated for the first time when the calculation value Th exceeds the first threshold value T1.

With the configuration, the calculation value Th can be easily calculated, and an increase in a load of the control can be suppressed.

In the operation panel 2, when the state in which the calculation value Th exceeds the first threshold value T1 continues for the certain time TL, the controller C (control unit) determines that the touch position sensor 6 (switch unit) is in the operation state even when the calculation value Th does not exceed the second threshold value T2.

In some cases, the contact area between the finger of the user and the touch position sensor 6 (switch unit) does not increase as the calculation value Th exceeds the second threshold value T2, for example, when the finger of the user is small or the operation is performed with a fingertip or the like. Therefore, when the state in which the calculation value Th exceeds the first threshold value T1 continues for the certain time TL, it is determined that the user operates the switch 4, and it is determined that the touch position sensor 6 (switch unit) is in the operation state even when the calculation value Th does not exceed the second threshold value T2. Accordingly, even when the contact area does not increase, for example, when the finger of the user is small or the operation is performed with a fingertip or the like, the operation on the switch 4 can be accurately detected, and the operation feeling of the user on the operation panel 2 can be improved.

In the operation panel 2, after determining that the touch position sensor 6 (switch unit) is in the operation state, the controller C (control unit) sets the fourth threshold value T4 (OFF threshold value Toff) based on the calculation value Th, and determines that the touch position sensor 6 (switch unit) is in the non-operation state when the calculation value Th is equal to or smaller than the fourth threshold value T4 (OFF threshold value Toff).

In the configuration, since the fourth threshold value T4, which is the OFF threshold value Toff, is set based on the calculation value Th, the OFF threshold value Toff can be set to a value corresponding to the user, so that the operation on the switch 4 can be accurately detected, and the operation feeling of the user on the operation panel 2 can be improved.

In the operation panel 2, after determining that the touch position sensor 6 (switch unit) is in the operation state, the controller C (control unit) sets the OFF threshold value Toff (fourth threshold value T4) based on the maximum value of the calculation value Th after the touch position sensor 6 (switch unit) is in the operation state.

In the configuration, based on the calculation value Th, the fourth threshold value T4, which is the OFF threshold value Toff, is set based on the maximum value of the calculation value Th after the touch position sensor 6 (switch unit) is in the operation state. Accordingly, the operation on the switch 4 can be accurately detected, and the operation feeling of the user on the operation panel 2 can be further improved.

In the operation panel 2, after determining that the touch position sensor 6 (switch unit) is in the non-operation state, the controller C (control unit) sets the ON threshold value Ton (second threshold value T2) based on the minimum value of the calculation value Th after it is determined that the touch position sensor 6 (switch unit) is in the non-operation state, and determines that the touch position sensor 6 (switch unit) is in the operation state when the calculation value Th is equal to or larger than the ON threshold value Ton (second threshold value T2).

Even when the consecutive pressing operation is performed on the switch 4, as compared with the case where the ON threshold value Ton (second threshold value T2) and the OFF threshold value Toff (fourth threshold value T4) are constant values, the operation intention of the user can be accurately understood and the operation on the switch 4 can be detected more accurately.

Although the embodiments of the present invention are described above, the above embodiments are merely a part of application examples of the present invention, and do not mean that the technical scope of the present invention is limited to the specific configurations of the above embodiments.

In the above embodiment, an example is shown in which the switch 4 is a switch for operating the air conditioner. However, the switch 4 may be a switch for operating a car audio, or may be a switch for another operation.

In the above embodiment, an example is shown in which ten switches 4 are provided. However, the number of the switches 4 is not limited thereto.

In the above embodiment, an example is shown in which the invention is applied to the operation panel 2 provided in the instrument panel 1. However, the invention can be applied to an input device provided in a console or an arm rest. The invention can be applied to an operation panel provided in various devices.

The present application claims a priority of Japanese Patent Application No. 2021-019177 filed with the Japan Patent Office on Feb. 9, 2021, all the contents of which are hereby incorporated by reference.

The invention claimed is:

1. An operation panel, comprising:
 a panel member;
 a switch unit provided on the panel member and to be pressed by a user;
 a sensor unit configured to output an electrical signal corresponding to a contact area between a finger of a user and the switch unit; and
 a control unit to which the electrical signal is input from the sensor unit, wherein the control unit is configured to:
  determine that a finger of a user and the switch unit are in contact with each other when a calculation value calculated based on the electrical signal input from the sensor unit exceeds a preset first threshold value, and set, based on the calculation value, a second threshold value larger than the first threshold value in accordance with a magnitude of the calculation value; and
  determine that the switch unit is in an operation state of being operated when the calculation value exceeds the second threshold value, and wherein
 the second threshold value is set by multiplying, by a predetermined coefficient, the calculation value which is calculated for a first time when the calculation value exceeds the first threshold value, the second threshold value set within a range that does not exceed a third threshold value which is a predetermined upper limit value, the control unit further configured to:
set a fourth threshold value based on the calculation value after determining that the switch unit is in the operation state; and
determine that the switch unit is in a non-operation state when the calculation value is equal to or smaller than the fourth threshold value.

2. The operation panel according to claim 1, wherein the control unit is further configured to:
set, after determining that the switch unit is in the operation state, the fourth threshold value based on a maximum value of the calculation value after the switch unit is in the operation state.

3. The operation panel according to claim 1, wherein the control unit is configured to:
set, after determining that the switch unit is in the non-operation state, the second threshold value again based on a minimum value of the calculation value after determining that the switch unit is in the non-operation state; and
determine that the switch unit is in the operation state when the calculation value is equal to or larger than the second threshold value.

4. An operation panel, comprising:
a panel member;
a switch unit provided on the panel member and to be pressed by a user;
a sensor unit configured to output an electrical signal corresponding to a contact area between a finger of a user and the switch unit; and
a control unit to which the electrical signal is input from the sensor unit, wherein the control unit is configured to:
determine that a finger of a user and the switch unit are in contact with each other when a calculation value calculated based on the electrical signal input from the sensor unit exceeds a preset first threshold value, and set, based on the calculation value, a second threshold value larger than the first threshold value in accordance with a magnitude of the calculation value; and
determine that the switch unit is in an operation state of being operated when the calculation value exceeds the second threshold value, wherein
the second threshold value is set by adding a predetermined coefficient to the calculation value which is calculated for a first time when the calculation value exceeds the first threshold value, the second threshold value set within a range that does not exceed a third threshold value which is a predetermined upper limit value, the control unit further configured to:
set a fourth threshold value based on the calculation value after determining that the switch unit is in the operation state; and
determine that the switch unit is in a non-operation state when the calculation value is equal to or smaller than the fourth threshold value.

5. An operation panel, comprising:
a panel member;
a switch unit provided on the panel member and to be pressed by a user;
a sensor unit configured to output an electrical signal corresponding to a contact area between a finger of a user and the switch unit; and
a control unit to which the electrical signal is input from the sensor unit, wherein the control unit is configured to:
determine that a finger of a user and the switch unit are in contact with each other when a calculation value calculated based on the electrical signal input from the sensor unit exceeds a preset first threshold value, and set, based on the calculation value, a second threshold value larger than the first threshold value in accordance with a magnitude of the calculation value;
determine that the switch unit is in an operation state of being operated when the calculation value exceeds the second threshold value; and
determine that the switch unit is in the operation state even when the calculation value does not exceed the second threshold value in a case where a state in which the calculation value exceeds the first threshold value continues for a predetermined time,
wherein the second threshold value is set within a range that does not exceed a third threshold value which is a predetermined upper limit value,
the control unit further configured to:
set a fourth threshold value based on the calculation value after determining that the switch unit is in the operation state; and
determine that the switch unit is in a non-operation state when the calculation value is equal to or smaller than the fourth threshold value.

\* \* \* \* \*